US011487019B2

(12) United States Patent
Turon et al.

(10) Patent No.: US 11,487,019 B2
(45) Date of Patent: *Nov. 1, 2022

(54) POWER MANAGEMENT IN WIRELESS TRACKING DEVICE OPERATING WITH RESTRICTED POWER SOURCE

(71) Applicant: FedEx Corporate Services, Inc., Memphis, TN (US)

(72) Inventors: Martin Turon, Berkeley, CA (US); Xin Yang, San Leandro, CA (US); Michael P. Dierks, San Francisco, CA (US)

(73) Assignee: FEDEX CORPORATE SERVICES, INC., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,815

(22) Filed: Aug. 18, 2020

(65) Prior Publication Data
US 2020/0379125 A1    Dec. 3, 2020

Related U.S. Application Data

(63) Continuation of application No. 16/664,536, filed on Oct. 25, 2019, now Pat. No. 10,782,416, which is a continuation of application No. 16/051,865, filed on Aug. 1, 2018, now Pat. No. 10,488,526, which is a continuation of application No. 15/610,791, filed on
(Continued)

(51) Int. Cl.
*G01S 19/34*    (2010.01)
(52) U.S. Cl.
CPC .................................. *G01S 19/34* (2013.01)

(58) Field of Classification Search
CPC ...... G01S 19/00; G01S 19/34; G08C 2201/10; G08C 2201/12; G08B 1/08
See application file for complete search history.

(56) References Cited

U.S. PATENT DOCUMENTS

| | | | |
|---|---|---|---|
| 5,592,173 | A | 1/1997 | Lau et al. |
| 6,339,397 | B1 | 1/2002 | Baker |

(Continued)

FOREIGN PATENT DOCUMENTS

| | | |
|---|---|---|
| CN | 101019761 | 8/2007 |
| CN | 101075752 | 11/2007 |

(Continued)

OTHER PUBLICATIONS

PCT International Search Report and Written Opinion, PCT Application No. PCT/US11/56784, dated Feb. 1, 2012 (12 pages).
(Continued)

*Primary Examiner* — Brian Wilson
(74) *Attorney, Agent, or Firm* — Finnegan, Henderson, Farabow, Garrett & Dunner, LLP

(57) ABSTRACT

A wireless tracking device operating in at least two modes to reduce power consumption and extend the operable period of the wireless tracking device. In an active mode, the wireless tracking device samples sensor signals at a higher resolution and may also actively communicate with a remote device via wireless connection. In a hibernation mode, most of the components or modules in the wireless tracking device are shut down to reduce power consumption. The wireless tracking device may switch to the active mode when a predetermine event is detected.

20 Claims, 3 Drawing Sheets

Related U.S. Application Data

Jun. 1, 2017, now Pat. No. 10,061,033, which is a continuation of application No. 12/980,171, filed on Dec. 28, 2010, now Pat. No. 9,696,429.

(56) References Cited

U.S. PATENT DOCUMENTS

| | | | |
|---|---|---|---|
| 6,492,904 B2 | 12/2002 | Richards | |
| 6,847,892 B2 | 1/2005 | Zhou et al. | |
| 7,212,829 B1 | 5/2007 | Lau et al. | |
| 7,253,731 B2 | 8/2007 | Joao | |
| 8,121,609 B2 * | 2/2012 | Bosnjakovic | G01S 19/06 455/457 |
| 8,239,169 B2 * | 8/2012 | Gregory | G01D 9/005 702/187 |
| 8,314,704 B2 | 11/2012 | Cova et al. | |
| 8,555,355 B2 | 10/2013 | Rathbun | |
| 8,725,165 B2 | 5/2014 | Lau et al. | |
| 9,177,282 B2 | 11/2015 | Stevens et al. | |
| 9,974,042 B2 | 5/2018 | Skaaksrud | |
| 10,438,162 B2 | 10/2019 | Sharma et al. | |
| 10,990,922 B1 | 4/2021 | Subramanian et al. | |
| 2002/0127983 A1 * | 9/2002 | Black | H04B 7/082 455/135 |
| 2002/0180618 A1 | 12/2002 | Beri et al. | |
| 2004/0176127 A1 | 9/2004 | Ballantyne et al. | |
| 2004/0192352 A1 | 9/2004 | Vallstrom et al. | |
| 2004/0207268 A1 * | 10/2004 | Muth | G01R 33/09 307/413 |
| 2007/0103296 A1 | 5/2007 | Paessel et al. | |
| 2008/0086391 A1 | 4/2008 | Maynard et al. | |
| 2008/0174444 A1 | 7/2008 | Noda | |
| 2008/0246656 A1 | 10/2008 | Ghazarian | |
| 2009/0058719 A1 | 3/2009 | Huang et al. | |
| 2009/0312032 A1 | 12/2009 | Bornstein et al. | |
| 2010/0033424 A1 | 2/2010 | Kabasawa et al. | |
| 2010/0233989 A1 | 9/2010 | Constien et al. | |
| 2010/0271620 A1 | 10/2010 | Guo | |
| 2010/0283575 A1 | 11/2010 | Tubb et al. | |
| 2011/0018707 A1 | 1/2011 | Dobson et al. | |
| 2011/0133888 A1 | 6/2011 | Stevens et al. | |
| 2012/0310854 A1 | 12/2012 | Cova et al. | |
| 2015/0262123 A1 | 9/2015 | Sharma et al. | |

FOREIGN PATENT DOCUMENTS

| | | | |
|---|---|---|---|
| EP | 2226778 | 9/2010 | |
| JP | 2008-171298 | 7/2008 | |
| WO | WO 2002/44865 A2 | 6/2002 | |
| WO | WO 2006/092466 | 9/2006 | |
| WO | WO 2007/028624 | 3/2007 | |
| WO | WO 2008/020223 A2 | 2/2008 | |
| WO | WO-2008020223 A1 * | 2/2008 | G08B 13/14 |

OTHER PUBLICATIONS

Request for Inter Partes Reexamination for U.S. Pat. No. 7,212,829, dated Feb. 16, 2012 (351 pages).

Petition for Inter Partes Review for U.S. Pat. No. 8,725,165, dated May 30, 2014 (66 pages).

Bhuptani, et al.; RFID Field Guide Deploying Radio Frequency Identification Systems; Feb. 2005; Prentice Hall; USA (292 pages).

Bajpai, et al.; Unfiled Provisional Application; *Location Privacy Enforcement in a Location-Based Services Platform*; Dec. 17, 2008 (22 pages).

Geofencing, A Useful Way To Corral Your Devices; posted by Katie Lane; Cisco Meraki; Sep. 11, 2013; (3 pages). https://web.archive.org/web/20131023085003/https://meraki.cisco.com/blog/2013/09/geofencing-a-useful-way-to-corral-your-devices/.

Heydon; Bluetooth Low Energy the Developer's Handbook; Oct. 2012; Prentice Hall; USA (368 pages).

Guidelines for Seafood Retailers; Govt. of Australia Dept. of Fisheries, Feb. 2002 (45 pages).

An Analysis of the Requirements, Current Conditions and Opportunities for Traceability in the British Columbia Seafood Sector; Jun. 2005 (177 pages).

SiLabs; Optimizing Current Consumption in Bluetooth Low Energy Devices; Version 2.13 (https://doc.silabs.com/bluetooth/2.13/) (12 pages).

Tiwari; An Introduction to QR Code Technology; *2016 International Conference on Information Technology*; IEEE Xplore (6 pages).

Vice Article; How the Railroad Industry Invented, Then Immediately Discarded, the Barcode; Oct. 24, 2017 (https://www.vice.com/en/article/qv38wp/how-the-railroad-industry-invented-then-immediately-discarded-the-barcode) (6 pages).

* cited by examiner

POWER MANAGEMENT IN WIRELESS TRACKING DEVICE OPERATING WITH RESTRICTED POWER SOURCE

CROSS-REFERENCE TO RELATED APPLICATIONS

[0001] This application is a continuation of U.S. application Ser. No. 16/664,536, filed on Oct. 25, 2019, which is a continuation of U.S. application Ser. No. 16/051,865, filed Aug. 1, 2018, now U.S. Pat. No. 10,488,526, issued Nov. 26, 2019, which is a continuation of U.S. application Ser. No. 15/610,791, filed Jun. 1, 2017, now U.S. Pat. No. 10,061,033, issued Aug. 28, 2018, which is a continuation of U.S. application Ser. No. 12/980,171, filed Dec. 28, 2010, now U.S. Pat. No. 9,696,429, issued Jul. 4, 2017, each of which is incorporated herein by reference.

BACKGROUND OF THE INVENTION

1. Field of the Invention

This invention relates to managing operations of a wireless tracking device with a restricted power source, more specifically to operating the wireless tracking device in more than one mode of operation to reduce power consumption and prolong its operational time.

2. Background of the Invention

Wireless tracking devices are employed to track locations and conditions of various assets. Such wireless tracking devices are often mounted on the assets or placed in the vicinity of the assets. As the assets are transported or are exposed to changing environment, the wireless tracking devices detect the location and/or sense changing conditions of the assets. Then, the wireless tracking devices send wireless messages indicating the locations and/or other environment parameters of the assets to a remote monitoring station. Based on the collected information, the remote monitoring station may prompt actions such as sending reports to customers, taking remedial actions to prevent deterioration of the assets, and initiating retrieval of stolen assets.

Generally, a wireless tracking device includes various components and sensors enclosed in a casing. The casing provides robust protection against dirt or other contaminants as well as external forces. The wireless tracking device may include various components such as temperature sensors, humidity sensors, light sensors, accelerometers, gyroscopes, magnetometers, controllers, GPS modules and wireless communication modules. These components or modules may consume power during their operations. Some wireless tracking devices include sensors to accommodate diverse applications whereas other wireless tracking devices are equipped with fewer types of sensors selected for specific applications.

To provide power to these components and modules, a wireless tracking device includes a restricted power source such as batteries or solar cells. In many cases, the wireless tracking devices operate in environments where access to other power sources is unavailable. The wireless tracking devices often rely on the restricted power source for their operations. Hence, to increase the operable time of a wireless tracking device, it is necessary to reduce the power consumption of its components.

SUMMARY OF THE INVENTION

Embodiments relate to a wireless tracking device that operates in at least two modes of operation to reduce power consumption. In a hibernation mode, the wireless tracking device turns off the components consuming a large amount of power to preserve power. The wireless tracking device is intermittently placed in an active mode where components consuming a large amount of power are turned on. When an event is detected, the wireless tracking device switches from the hibernation mode to the active mode to track locations or detect changes in its environment. The wireless tracking device may revert back to the hibernation mode if no further events are detected or a preset time is elapsed.

In one embodiment, the components turned off in the hibernation mode include a locating device for determining the location of the wireless tracking device and a communication module for sending the message over a wireless network. The locating device and the communication module consume a large amount of power, and hence, these components are intermittently operated in the active mode to preserve power.

In one embodiment, the wireless tracking device includes two controllers. One controller consumes less power than the other controller. The controller consuming less power remains turned on in both the active mode and the hibernation mode. In contrast, the controller consuming more power is turned on selectively during the active mode to control components that consume a large amount of power.

In one embodiment, a geofence is established for an area having poor connectivity to the wireless network. The wireless tracking module determines proximity to the geofence, and switches to the active mode at a higher frequency to detect whether the wireless tracking module has entered the geofence and to send updated messages before the wireless tracking device enters the geofence.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes.

DETAILED DESCRIPTION OF THE INVENTION

Embodiments described herein provide a wireless tracking device operating in at least two modes to reduce power consumption and extend the operable time of the wireless tracking device. In an active mode, the wireless tracking device activates a communication module for communicating with a remote device via wireless connection or other components that consume a large amount of power. In a hibernation mode, the components or modules in the wireless tracking device are shut down to reduce power consumption. The wireless tracking device may switch from the hibernation mode to the active mode selectively when a predetermine event is detected.

Example Use of Wireless Tracking Device

Figure 1:
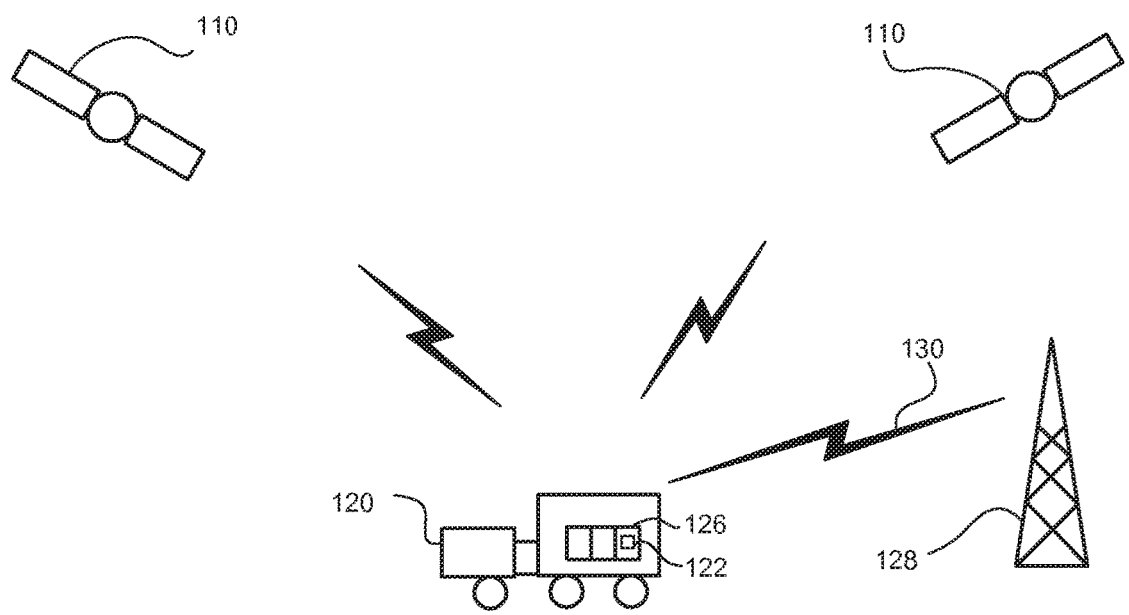
FIG. 1 is a conceptual diagram illustrating a wireless tracking device in a vehicle, according to one embodiment.

FIG. 1 is a diagram illustrating a wireless tracking device 122 in a moving vehicle 120. The wireless tracking device 122 may be located in a cargo 126 being transported by the vehicle 120. In this example, the wireless tracking device 122 tracks its location using a. Global Positioning System (GPS) module that detects signals from satellites 110. The wireless tracking device 122 inside cargoes 126 also communicates with a remote monitoring station 128 over a wireless communication channel 130.

The vehicle 120 may carry multiple units of cargoes 126 where each unit is equipped with a wireless tracking device 122. Each cargo 126 may be destined to a different target location. As a cargo 126 is transported, a wireless tracking device 122 attached to the cargo 126 tracks the location of the cargo 126 and environmental conditions surrounding the cargo 126. Then, the location and other environment information are transmitted to a remote monitoring station 128 in a wireless message.

The environment conditions detected by the wireless tracking device 122 may include, but are not limited to, temperature, humidity, light, sound, vibration, tilt, shock, certain types of chemical compounds, pressure, magnetic field, smoke, and movements. The wireless tracking device 122 may be configured to detect some or all of these environment conditions.

The use of wireless tracking device 122 is not limited to moving cargoes 126. The wireless tracking device 122 may be used for an object that remains stationary. In such case, the wireless tracking device 122 is used primarily for detecting environmental conditions surrounding the wireless tracking device 122. Further, the vehicle 120 is merely an example of a mode of transport. The wireless tracking device 122 and the cargo 126 may be transported using other modes of transport such as vessels, trains or airplanes. Cargo 126 may be any asset transported in commerce, including among other things, envelopes, parcels, express packages, boxes, palettes, containers, crates, and specialty goods and materials.

Example Structure of Wireless Tracking Device

The wireless tracking device 122 operates in two distinct modes: an active mode and a hibernation mode. In the active mode, most or all of the components in the wireless tracking device 122 are activated. The activated components include high power consumption components such as a wireless communication module. In the hibernation mode, a fewer number of components or modules in the wireless tracking device 122 are activated. Other components or modules are turned off to preserve power. The wireless tracking device 122 switches between the active mode and the hibernation mode in response to detecting or in anticipation of an event.

Figure 2:
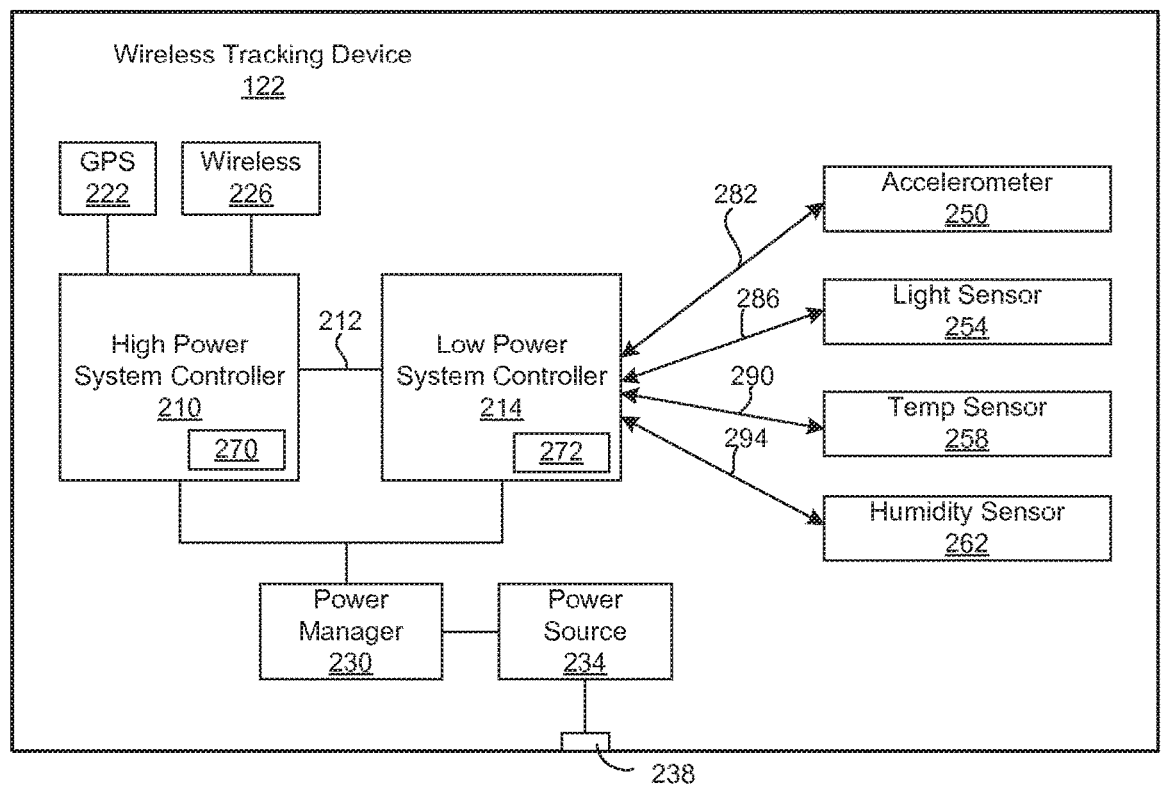
FIG. 2 is a block diagram illustrating a wireless tracking device, according to one embodiment.

FIG. 2 is a block diagram illustrating the wireless tracking device 122, according to one embodiment. The wireless tracking device 122 may include, among other components, a high power system controller 210, a low power system controller 214, a Global Positioning System (GPS) module 222, a wireless communication module 226, a power manager 230, a restricted power source 234, and various sensors 250 though 262. The wireless tracking device 122 may include other components not illustrated in FIG. 2 such as an input module or speakers.

The wireless tracking device 122 of FIG. 2 has a dual processor structure including two controllers: the high power system controller 210 and the low power system controller 214. By using the two controllers, the power consumption may be reduced in the hibernation mode while obtaining high computing capacity during the active mode. When the wireless tracking device 122 is placed in the active mode, the high power system controller 210 becomes active and performs power intensive operations. Such power intensive operations include, for example, determining the location of the wireless tracking device 122 using the GPS module 222 and communicating wirelessly with the remote monitoring station 128 via the wireless communication module 226. During the hibernation mode, the wireless tracking device 122, the GPS module 222 and the wireless communication module 226 may be disabled to reduce power consumption.

In one embodiment, the low power system controller 214 is embodied as ATMEGA 8-bit microcontroller (available from Atmel Corporation of San Jose, Calif.), Energy Micro Gecko micro controller (available from Energy Micro AS of Oslo, Norway) or SAM3 (available from Atmel Corporation of San Jose, Calif.). Examples of the high power system controllers 210 include the Marvell PXA series, ARM11, Cortex-A series, or TI DSPs.

In one embodiment, the high power system controller 210 controls the operation of the GPS module 222 and the wireless communication module 226. When the high power system controller 210 is turned off, the GPS module 222 and the wireless communication module 226 are also deactivated to reduce power consumption.

The low power system controller 214 remains active in both the active mode and the hibernation mode. The low power system controller 214 determines whether to place the wireless tracking device 122 in the active mode or the hibernation mode, as described below in detail with reference to FIG. 3. In one embodiment, the low power system controller 214 is connected to low-power consumption components such as sensors 250 through 262. The low power system controller 214 continues to receive sensor signals 282 through 294 even in the hibernation mode to avoid losing meaningful sensor data. However, the sampling rate and the sensitivity of the sensor signals 282 through 294 may be reduced in the hibernation mode to reduce power consumption.

The low power system controller 214 sends commands to the power manager 230 to turn on or off power provided to the high power system controller 210. When the low power system controller 214 issues a command indicating that the wireless tracking device 122 should be placed in the hibernation mode, the power manager 230 turns off power to the high power system controller 210.

The power manager 230 is connected to the power source 234. The power source 234 may be a restricted power source such as a battery or solar cells. In one embodiment, the power source 234 includes a charge circuit. The charger circuit receives charging electric current via port 238 to charge the battery.

The GPS module 222 may include an antenna and a signal processing unit for receiving GPS signals. The GPS module 222 operates under the command of the high power system controller 210 to identify the current location of the wireless tracking device 122. In one embodiment, the GPS module 222 embodies A-GPS (Assisted GPS) which improves the startup performance or TTFF (Time To First Fix) by utilizing data received via the wireless communication module 226. For this purpose, the GPS module 222 receives ephemeris data from a remote server via the wireless communication module 226.

The wireless communication module 226 includes a transceiver for sending or receiving data to or from the remote monitoring station 128. The wireless communication module 226 may establish communicating using various communication protocols such as GSM, WiFi, Bluetooth, Zigbee, UMTS/HSxPA, 3GPP Long Term Evolution (LTE) and WiMAX.

The sensors 250 through 262 detect various physical properties or conditions and send the sensor signals 282 through 294 to the low power system controller 214. The sensors in the wireless tracking device 122 include, for example, an accelerometer 250, a light sensor 254, a temperature sensor 258 and a humidity sensor 262. The wireless tracking device 122 may include other types of sensors to detect different physical properties or conditions.

The high power system controller 210 and the low power system controller 214 communicate over a data bridge 212. The high power system controller 210 may receive the sensor data from the low power system controller 214, compiles the sensor data into a message, and sends the message to the remote monitoring station 128 via the wireless communication module 226. On the other hand, the low power system controller 214 receives location information (based on the GPS module 222) from the high power system controller 210 or any data (e.g., control commands) received from the remote monitoring station 128 via the data bridge 212.

The high power system controller 210 and the low power system controller 214 include computer readable storage medium 270 and computer readable storage medium 272, respectively. The computer readable storage medium 270 stores instructions for execution by the high power system controller 210. The computer readable storage medium 272 stores instructions for execution by the low power system controller 214. In one embodiment, the computer readable storage media 270, 272 are embodied as a non-volatile memory device (e.g., EEPROM (Electrically Erasable Programmable Read-Only Memory) or a flash memory), a volatile memory device (e.g., Random Access Memory (RAM)) or a combination of both.

The embodiment of FIG. 2 is merely illustrative. Wireless tracking devices of different configuration may also be used. For example, a single processor architecture including only a single controller may be used. In the single processor architecture, all the components and sensors are connected and controlled by the single controller. In one embodiment, the single controller may operate in two modes: an active mode with a higher processing capacity, and a hibernation mode with reduced power consumption. In yet another embodiment, the high power system controller 210 and the low power system controller 214 could also be implemented in a multi core configuration or via virtualization with a single core.

Power Mode Switching Scheme

Figure 3:
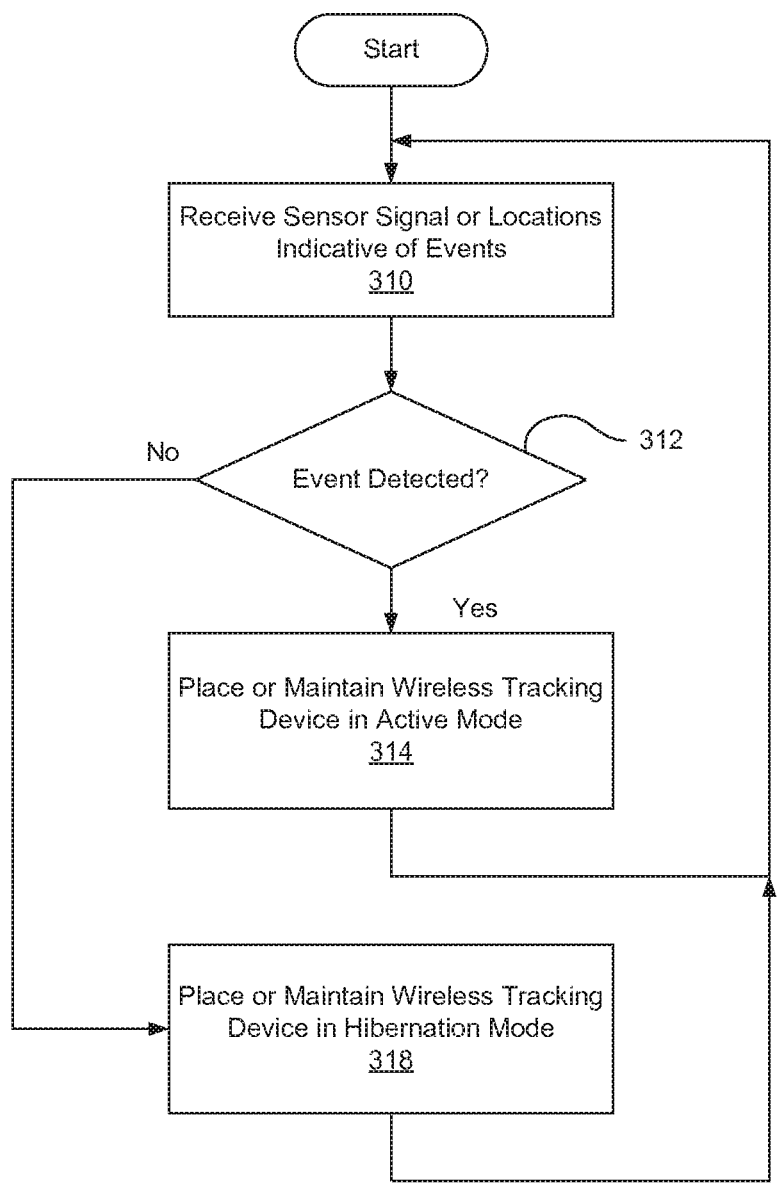
FIG. 3 is a diagram illustrating a method of operating the wireless tracking device in more than one mode, according to one embodiment.

FIG. 3 is a diagram illustrating a method of placing the wireless tracking device 122 in the active mode or the hibernation mode, according to one embodiment. The low power system controller 214 receives 310 the sensor signals 282 through 294 from the sensors 250 through 262 or the location of the wireless tracking device 122 from the GPS module 222. For this purpose, the low power system controller 214 stores instructions for switching power modes in the computer readable storage medium 272.

Then, the low power system controller 214 determines 312 if one or more of predetermined events are detected to place the wireless tracking device 122 in the active mode. Various types of events may be used for switching the modes. The wireless tracking device 122 is placed in the active mode when events of interest to a user are likely to occur or continue whereas the wireless tracking device 122 is placed in the hibernation mode when the events of interest are unlikely to occur or continue.

If one or more of predetermined events are detected, the low power system controller 214 places or maintains 314 the wireless tracking device 122 in the active mode. In one embodiment, the predetermined events include detection of movement of the wireless tracking device 122 by the accelerometer sensor or the speed of the wireless tracking device 122 above a threshold. While the wireless tracking device 122 is in the active mode, the low power system controller 214 may monitor changes in the location based on GPS signals from the current active mode session to determine the speed of the wireless tracking device 122. Alternatively, the low power system controller 214 may compare the location of the wireless tracking device 122 with the location of the wireless tracking device 122 in the previous active mode session to determine the speed of the wireless tracking device 122.

In one embodiment, the wireless tracking device 122 is placed or maintained 314 in the active mode when external events are detected via the sensors 250 through 262. The external events refer to events occurring outside the wireless tracking device 122 and may include, for example, (i) a motion of the wireless tracking device 122 (as detected by the accelerometer 250), (ii) changes from indoor to outdoor or vice versa (as detected by the light sensor 254), (iii) changes in temperature (as detected by the temperature sensor 258), (iv) changes in the humidity (as detected by the humidity sensor 262), and (v) detection of certain chemical compounds or smoke. If such external events are detected, events of interest are likely to ensue or continue. Hence, the wireless tracking device 122 is maintained in the active mode to capture data associated with the external events.

In one embodiment, the event may be passing of time or a signal from a timer indicating a predetermined time. The low power system controller 214 may periodically switch the wireless tracking device 122 to the active mode. The low power system controller 214 switches to the active mode more often or stays in the active mode for a longer time when the accelerometer 250 sends a signal 282 indicating the movement of the wireless tracking device 122. The wireless tracking device 122 is more likely to experience significant changes in the environment when the wireless tracking device 122 is being transported. Hence, the wireless tracking device 122 is placed in the active mode to send more frequent updates to the remote monitoring station 128. The low power system controller 214 may switch back to the hibernation mode if a certain amount of time is elapsed.

If no significant events are detected for a predetermined amount of time, the low power system controller 214 places or maintains 318 the wireless tracking device 122 in the hibernation mode. The wireless tracking device 122 is unlikely to encounter significant changes when predetermined events are not detected. Hence, the low power system controller 214 places the wireless tracking device 122 in the hibernation mode to preserve power.

After placing or maintaining 314, 318 the wireless tracking device 122 in the active mode or the hibernation mode, the process returns to receiving 310 the sensor signals or locations.

In one embodiment, more significant events in the sensor signals or more drastic changes in locations are needed to switch the wireless tracking device 122 from the hibernation mode to the active mode compared to the events for maintaining the wireless tracking device 122 in the active mode. The sensitivity of sensors (e.g., the accelerometer 250) is lowered in the hibernation mode to avoid the wireless tracking device 122 from waking up to the active mode due to minor variances in the sensor signals.

In contrast, if the wireless tracking device 122 is currently in the active mode, the sensitivity of the sensors is increased. The fact that the wireless tracking device 122 is currently in the active mode indicates that the wireless tracking device 122 is likely to experience other significant events. By adjusting the sensitivity to sensor signals and location changes based on the mode of the wireless tracking device 122, the wireless tracking device 122 may be prevented from waking up due to insignificant events while retaining the chance of detecting significant events.

Geofencing of Wireless Tracking Device

The wireless tracking device 122 may move through a geographic region where wireless communication is not available or where reception of the wireless communication is poor. In one embodiment, such geographic region may be established as a goefence in which the wireless tracking device 122 does not attempt to communicate with the remote monitoring station 128. A geofence herein refers to a geographical area artificially defined for one purpose or the other. By avoiding communication in the geofenced area, power consumption associated with attempting to communicate with the remote monitoring station 128 in a poor reception area can be avoided. In addition, this feature may be used to satisfy certain regulatory requirements about RF transmissions in particular areas.

Figure 4:
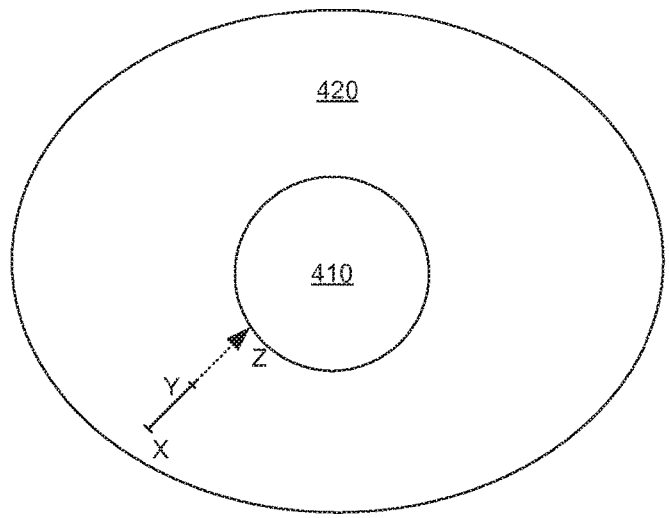
FIG. 4 is a diagram illustrating a geofence associated with different modes of operation, according to one embodiment.

FIG. 4 is a diagram illustrating a geofence 410 associated with wireless communication of the wireless tracking device 122 where wireless communication is unavailable or the signal reception is poor. Within the geofence 410, the wireless tracking device 122 does not attempt to communicate with the remote monitoring station 128. Data collected for events while the wireless tracking device 122 remains in the geofence 410 are stored and then transmitted to the remote monitoring station 128 when the wireless tracking device 122 leaves the geofence 410. In FIG. 4, region 420 represents an area where the wireless communication of the wireless tracking device 122 is available with good reception.

In the example of FIG. 4, the wireless tracking device 122 moves from point X to point Z. While the wireless tracking device 122 is in the region 420 and distanced away from the geofence 410 (represented by line X-Y), the wireless tracking device 122 switches to the active mode at a first frequency (i.e. sampling interval). As the wireless tracking device 122 approaches the geofence 410 (represented by line Y-Z), the wireless tracking device 122 switches to the active mode at a second frequency higher than the first frequency (i.e., the wireless tracking device 122 is placed in the active mode more often). For example, the wireless tracking device 122 may switch from the hibernation mode to the active mode every 10 minutes when the wireless tracking device 122 is traveling from point X to point Y. The same wireless tracking device 122 may switch from the hibernation mode to the active mode every 5 minutes when the wireless tracking device 122 is traveling from point Y to point Z.

In one embodiment, the wireless tracking device 122 gradually switches to active mode with increasing frequency or stays in the active mode for a longer time as the wireless tracking device 122 approaches the geofence 410.

Figure 5:
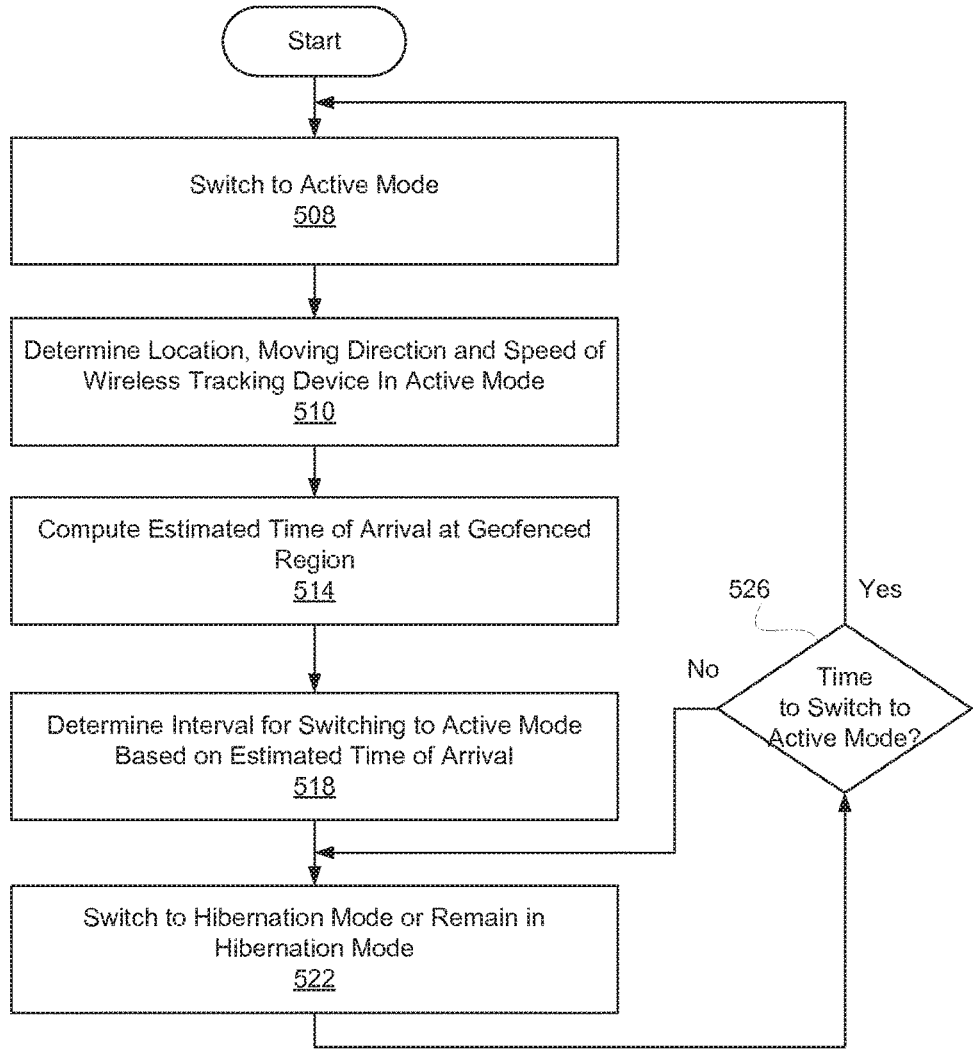
FIG. 5 is a flowchart illustrating the process of switching between the active mode and the hibernation mode when the geofence is implemented.

FIG. 5 is a flowchart illustrating the process of switching between the active mode and the hibernation mode when the geofence 410 is implemented. First, the wireless tracking device 122 switches 508 to the active mode. In the active mode, the low power system controller 214 determines 510 the location, the moving direction and the speed of the wireless tracking device 122. Based on the location, the moving direction and the speed of the wireless tracking device 122, the wireless tracking device 122 computes 514 the estimated time that the wireless tracking device 122 will arrive at the region of the geofence 410.

Based on the estimated time of arrival at the region of the geofence 410, the interval for switching to the active mode is determined 518. After any process in the current active mode is finished or preset time for staying in the active mode is elapsed, the wireless tracking device 122 switches 522 to the hibernation mode.

Then the wireless tracking device 122 determines 526 whether it is time to switch to the active mode based on the computed interval. If it is time to switch to the active mode, the process proceeds to switch 508 the wireless tracking device 122 to the active mode and repeats the subsequent steps. If it is not yet time to switch to the active mode, the wireless tracking device 122 remains 522 in the hibernation mode.

By adjusting the interval for placing the wireless tracking device 122 in the hibernation mode based on the estimated time of arrival at a poor wireless signal reception area, the wireless tracking device 122 can continue to update the remote monitoring station with wireless messages without using excessive amount of power.

What is claimed is:

1. A wireless tracking device, comprising:
    a locating device configured to determine a location of the wireless tracking device;
    at least one controller coupled to the locating device, the at least one controller configured to:
        receive, from at least one sensor, one or more signals representing a condition associated with the wireless tracking device;
        switch the wireless tracking device from a first mode to a second mode in response to detecting a signal exceeding a first threshold, wherein the first mode consumes less power than the second mode and the at least one sensor is less sensitive in the first mode than in the second mode; and
        maintain the wireless tracking device in the second mode for a period of time in response to detecting a signal exceeding a second threshold, wherein the second threshold is less than the first threshold; and
    a communicator coupled to the controller and configured to transmit the location of the wireless tracking device in the second mode.

2. The wireless tracking device of claim 1, wherein the communicator is configured to send a message indicating the location of the wireless tracking device via a wireless network.

3. The wireless tracking device of claim 2, wherein the at least one controller comprises a first controller and a second controller, the first controller consuming less power than the second controller during operation.

4. The wireless tracking device of claim 3, wherein the second controller is configured to operate the locating device and the communicator.

5. The wireless tracking device of claim 4, wherein the first controller is configured to turn on the second controller, the locating device, and the communicator in the second mode.

6. The wireless tracking device of claim 2, further comprising a power source for providing power to the locating device, the at least one controller, and the communicator.

7. The wireless tracking device of claim 1, wherein the condition relates to surroundings of the wireless tracking device.

8. The wireless tracking device of claim 1, wherein the at least one sensor comprises an accelerometer.

9. The wireless tracking device of claim 1, wherein the at least one sensor comprises a temperature sensor.

10. The wireless tracking device of claim 1, wherein the locating device comprises a Global Positioning System (GPS) module.

11. The wireless tracking device of claim 1, wherein the locating device receives ephemeris data from a remote server.

12. The wireless tracking device of claim 1, wherein the at least one controller is configured to receive a signal from a timer indicating a time.

13. A method of operating a wireless tracking device, comprising:
    receiving, from at least one sensor, one or more signals representing a condition associated with the wireless tracking device;
    switching the wireless tracking device from a first mode to a second mode in response to detecting a signal exceeding a first threshold, wherein the first mode consumes less power than the second mode and the at least one sensor is less sensitive in the first mode than in the second mode; and
    maintaining the wireless tracking device in the second mode for a period of time in response to detecting a signal exceeding a second threshold, wherein the second threshold is less than the first threshold.

14. The method of claim 13, wherein the wireless tracking device comprises a first controller and a second controller, the first controller consuming less power than the second controller during operation.

15. The method of claim 14, wherein the first controller is configured to turn on the second controller and a locating device in the second mode.

16. The method of claim 13, wherein the condition relates to the surroundings of the wireless tracking device.

17. The method of claim 13, wherein the at least one sensor comprises an accelerometer.

18. The method of claim 13, wherein the at least one sensor comprises a temperature sensor.

19. A non-transitory computer-readable storage medium structured to store instructions executable by a processor in a wireless tracking device, the instructions, when executed cause the processor to:
    receive, from at least one sensor, one or more signals representing a condition associated with the wireless tracking device;
    switch the wireless tracking device from a first mode to a second mode in response to receiving a set of signals exceeding a first threshold, wherein the first mode consumes less power than the second mode and the at least one sensor is less sensitive in the first mode than in the second mode; and
    maintain the wireless tracking device in the second mode for a period of time in response to receiving a set of signals exceeding a second threshold, wherein the second threshold is less than the first threshold.

20. The non-transitory computer-readable storage medium of claim 19, further comprising transmitting a location of the wireless tracking device in the second mode but not the first mode.

* * * * *